United States Patent [19]

Vermilion

[11] Patent Number: 4,956,500

[45] Date of Patent: Sep. 11, 1990

[54] VULCANIZABLE RUBBER COMPOUND WITH IMPROVED TACKIFIER

[75] Inventor: Donn R. Vermilion, Newark, Ohio

[73] Assignee: Owens-Corning Fiberglas Corporation, Toledo, Ohio

[21] Appl. No.: 241,428

[22] Filed: Sep. 6, 1988

[51] Int. Cl.$^5$ .......................... C08L 7/00; C08L 9/00; C08L 9/06; C08L 95/00

[52] U.S. Cl. ..................... 525/54.5; 524/59; 524/68; 524/71; 524/505; 524/525

[58] Field of Search ....................... 524/59, 71, 68, 62, 524/505, 525; 525/54.5

[56] References Cited

U.S. PATENT DOCUMENTS

| | | | |
|---|---|---|---|
| 2,537,190 | 1/1951 | Lankau et al. | 260/28.5 |
| 3,334,058 | 8/1967 | Alm | 260/28.5 |
| 3,803,066 | 4/1974 | Petrossi | 260/28.5 |
| 3,963,659 | 6/1976 | Binder et al. | 260/28.5 |
| 4,032,491 | 6/1977 | Schoenke | 260/28.5 |
| 4,129,542 | 12/1978 | Matheson et al. | 260/28.5 |
| 4,273,685 | 6/1981 | Marzocchi et al. | 260/28.5 |
| 4,287,242 | 9/1981 | Monden et al. | 427/426 |
| 4,456,705 | 6/1984 | McCarthy | 521/83 |
| 4,473,606 | 9/1984 | Ruhl et al. | 428/131 |
| 4,485,201 | 11/1984 | Davis | 524/68 |
| 4,503,176 | 3/1985 | Barlow et al. | 524/62 |
| 4,537,921 | 8/1985 | Uffner et al. | 525/54.5 |

OTHER PUBLICATIONS

Rubber World Magazine's Blue Book Materials, Compounding Ingredients and Machinery for Rubber, 1985 Edition, entitled Tackifiers, pp. 233-244 by Lippincott & Peto.

Science and Technology of Rubber, Chapter 9, copyright 1978 by the Academic Press Inc. entitled The Rubber Compound and Its Composition, pp. 385 and 402.

Primary Examiner—Allan M. Lieberman
Attorney, Agent, or Firm—Patrick P. Pacella; Ted C. Gillespie; Robert F. Rywalski

[57] ABSTRACT

A vulcanizable rubber compound is provided which has an improved low cost tackifier included with the vulcanizable rubber. The tackifier is the reaction product, preferably an organic peroxide initiated reaction product, of a mixture of asphalt and an elastomer.

16 Claims, No Drawings

VULCANIZABLE RUBBER COMPOUND WITH IMPROVED TACKIFIER

TECHNICAL FIELD

The present invention relates to rubber compounds and more particularly, it relates to a vulcanizable rubber composition which includes an improved tackifier.

BACKGROUND ART

Vulcanizable rubber compositions have been manufactured for many years wherein a polymer, that is vulcanizable rubber, is included along with suitable rubber additives, for example, a tackifier, a vulcanizing agent, like sulfur, and various fillers. As is known, this so-called compound, or vulcanizable rubber composition or green rubber, is then subjected, in a mold, to heat and pressure to effect curing and formation of the final product, such as, for example, tires.

In order to form high quality products, it is necessary to use tackifiers in the vulcanizable rubber composition. These tackifiers promote the adherence of different pieces of the green or uncured rubber compound together and thereby allow convenient and precision build-up of plural pieces of rubber. The tackifiers used in the past are generally rather sophisticated organic chemicals and oftentimes are quite expensive. Frequently, in order to obtain the needed degree of tack, these tackifiers are used in substantial amounts, even to the point where they detrimentally impact on the ultimate properties of the vulcanized rubber composition.

Thus, it will be seen that there is a need in the art for providing tackifiers for vulcanizable rubber compound compositions wherein the tackifiers have improved tack per unit of weight and also are inexpensive and minimize undesirable side-effects.

DISCLOSURE OF THE INVENTION

In accordance with the present invention, the above-noted need in the art is satisfied by providing for a vulcanizable rubber composition which includes an improved tackifier. The tackifier is a preformed reaction product, preferably a pre-formed organic peroxide initiated reaction product, of a mixture consisting essentially of asphalt and a rubber. Unless indicted to the contrary, the term rubber includes elastomers and comprehends within its scope both vulcanizable elastomers as well as elastomeric copolymers having residual unsaturation.

DESCRIPTION OF THE INVENTION INCLUDING

THE BEST MODE OF CARRYING IT OUT

The tackifier formulated in accordance with the present invention can be used in green rubber or vulcanizable rubber composition. The vulcanizable rubber preferably employed in the compound can be any commonly used in tires, belts and hoses. Such rubbers can include natural and synthetic rubbers, like the nitrile rubbers, the butyl rubbers and butadiene rubbers. Thus, for example, the rubbers can include the nitrile-butadiene rubbers (NBR), copolymers of isoprene and isobutylene (butyl rubbers), styrene-butadiene rubbers, polyisoprene, polychloroprene, polybutadiene, and the ethylene-propylene-diene materials (EPDM). Outstanding results are obtained when employing a vulcanizable composition of a nitrile rubber, for example, a nitrile butadiene rubber, a butyl rubber, for example, a copolymer of isoprene and isobutylene and especially a styrene-butadiene rubber, for example, SBR.

The vulcanizable compound can include any of the numerous fillers commonly employed, for example carbon black, and can use any of the numerous additives commonly employed to enhance the ultimate properties of the vulcanized rubber. Sulfur and other conventional vulcanizing agents are also used.

The tackifier which is employed in accordance with the present invention is a preformed reaction product of a mixture of asphalt and a rubber, i.e., a rubbery polymer or an elastomer. In the preferred practice of the invention, the reaction product is formed using an organic peroxide free radical initiator, that is the reaction product is an organic peroxide initiated reaction product. The synthesis reaction may be conducted in the molten state, at atmospheric or super-atmospheric pressure, and it may, and preferably is, conducted by starting with a rubber latex. Since the reaction medium is free of polymerizable vinyl aromatic monomers, like styrene, the reaction can be conveniently carried out in extremely short periods of time. In one particularly preferred embodiment, the reaction is carried out employing a twin screw extruder as the reaction vessel. The reaction temperatures are not narrowly critical but generally, it is preferred to perform the reaction at temperatures on the order of about 300 to 400° F. and preferably 350 to 400° F. Reaction times of about 1 minute to about 2 minutes are quite suitable when using Lupersol 101, which is a preferred technique.

The asphalts employed in forming the reaction product can be any of a wide variety of asphalts but preferably are the vacuum distillation residues. Such asphalts can include paving grade asphalts, roofing grade asphalts, as well as fluxes employed to form such roofing grade asphalts. Quite suitable asphalts will have penetrations (at 77° F.), generally ranging from about 50 to about 250 and will have softening points of about 90° F. to about 150° F. A particularly suitable asphalt is an AC-20 paving grade asphalt.

The rubber employed in forming the reaction product can be any of those listed above for the vulcanizable rubber composition. The rubber can be linear or radial block copolymers of styrene and butadiene generally available in the trade under the designation KRATON and FINAPRENE. It is generally preferred to form the reaction product in a reaction medium wherein a rubber reactant having residual unsaturation is in an aqueous medium. That is, it is preferred to employ rubber in the form of a latex, e.g. an SBR latex.

A wide variety of organic peroxide free-radical initiators may be employed. Lupersol 101 is preferred which is 2,5 dimethyl-2,5 di(t-butylperoxy) hexane. Other organic peroxide can, of course, be employed including for example the alpha-cumyl monoperoxyesters, t-amyl monoperoxyesters, t-butyl monoperoxyesters as well as diperoxyesters. Dialkyl, diacyl, and peroxyesters are generally suitable. Such materials are available from Pennwalt.

Generally, the amount of rubber which is employed to form the reaction of the asphalt and rubber will be between about one percent to about 15 percent by weight of the combined amounts of asphalt and rubber. The amount of reaction product, be it the organic peroxide initiated reaction product or the thermally initiated reaction product, which is employed with the vulcanizable composition, may vary but is generally preferred to use about 0.1 to about 5 parts by weight reaction product per hundred parts by weight of vulcanizable rubber (pphR). Any of the conventional mixing methods, e.g. molten mixing, currently employed for compounding rubber may be employed in the present invention.

While the above describes the present invention with sufficient particularity to enable those skilled in the art to make and use same, nonetheless, further exemplification follows:

EXAMPLE IA

Both a thermally reacted and an organic peroxide initiated reaction product of asphalt and rubber were prepared as follows using a Baker Perkins twin-screw extruder.

The extruder was generally heated and operated at a temperature of about 350 to 400° F. Molten AC20 asphalt was fed to one entrance port of the extruder at the rate of about 611 grams per minute. Into another port, an SBR latex (Goodyear 6769 which is about 50 percent SBR of which the polymerized styrene is about 48 percent by weight) was fed at the rate of about 53 grams per minute. Lupersol 101 organic peroxide initiator was fed to another port at the rate of about 15 milliliters per minute. The reaction was controlled to maintain a temperature of about 350° F.–400° F. It is estimated that the average reaction time in the extruder was on the order of about 75 seconds. Of course, as will be apparent, under these conditions the latex water was flashed off and a molten reaction product was obtained which was then cooled and solidified. This organic peroxide initiated reaction product is subsequently designated Sample No. 2.

In similar manner, another product was manufactured except no organic peroxide initiator was added; this thermally reacted tackifier is referred to below as Sample No. 3.

EXAMPLE IB

Two vulcanizable compositions, or compounds, were prepared. The first composition (designated SBR) was formulated from about 100 parts by weight of SBR-1500, three parts by weight of ZnO, 1.75 parts by weight sulfur, one part by weight stearic acid, 50 parts by weight of N-770 carbon black and one part by weight of N-t-butyl-2-benzothiazolesulfenamide (TBBS). Another vulcanizable composition (designated NBR) was formulated from 100 parts by weight of Goodyear NBR, three parts by weight of ZnO, 1.5 parts by weight of sulfur, one part by weight stearic acid, 40 parts by weight of N-330 carbon black.

Green tackified rubber was produced by combining two pphR and five pphR respectively of each of Sample No. 2 and Sample No. 3 with NBR and SBR master batch. These vulcanizable compositions are formed by conventional melt blending techniques to provide rectilinear panels so that various properties including tack could be measured. Tack was generally measured in a manner analogous to a shear lap adhesion test. That is, sample panels of the same composition were overlapped and compressed at the overlapping area to provide a controlled amount of compressive force (about one psi). The tack was obtained by simply putting the panels in tension to effect a shearing action and separation. Table I below summarizes the tack data. The numbers reported for tack are relative numbers, not absolute, and are normalized to the tack for samples not using a tackifier.

TABLE I

| RUBBER | TACKIFIER LOADING | TACK RESULTS | | | | | |
|---|---|---|---|---|---|---|---|
| | | 1 DAY | | | 7 DAY | | |
| | | #2 | #3 | PH | #2 | #3 | PH |
| SBR | 2 (pphR) | 3.6 | 3.9 | 1.3 | 3.8 | 3.4 | 1.9 |
| | 5 (pphR) | 6.0 | 3.3 | 1.2 | 6.4 | 4.6 | 2.8 |
| NBR | 2 (pphR) | 3.1 | 2.9 | 1.6 | 4.0 | 3.5 | 2.1 |
| | 5 (pphR) | 4.0 | 4.3 | 1.8 | 4.0 | 4.4 | 3.4 |

PH refers to a rubber compound in which the tackifier is a conventional tackifier, namely pentalyn H. Pentalyn H is a pentaerythrital ester of a rosin acid.

The data in Table 1 show the tackifier of the present invention performs in a manner superior to that of the conventional tackifier. The data for one day and seven days refer to measurements made one day and seven days after the tackified vulcanizable lap sample was prepared. It is interesting to observe the completely unexpected and unpredictable results obtained with SBR at 5 pphR loadings of organic peroxide initiated tackifier, i.e. note the extremely high tack values both at the one day and the seven day levels. Such values when using a loading of an excess of two pphR is completely unexpected.

EXAMPLE IIA

In a manner similar to that of Example IA above, another organic peroxide initiated reaction product of AC20 asphalt and rubber was produced. In this instance, Polysar 763 SBR latex was employed instead of the Goodyear 6769 material. The Polysar 763 was fed through the extruder at the rate of 66 grams per minute, AC20 asphalt was fed at the rate of 673 grams per minute and the Lupersol 101 peroxide was fed at the rate of 36.0 grams per minute with the extruder generally being maintained at a temperature of about 350° F.

EXAMPLE IIB

Another vulcanizable composition (Butyl) was produced. The Butyl composition was obtained by admixing 100 parts by weight of a butyl rubber about three parts by weight of ZnO, about 1.75 parts by weight of sulfur, about one part by weight stearic acid, about 50 parts by weight of N330 and about one part by weight of tetramethylthiuramdisulfide (TMTD).

Samples were then made using the three master compound formulations which were tackifier-free, namely tackifier-free SBR rubber compound, tackifier-free NBR rubber compound and tackifier-free Butyl rubber compound. Samples were also produced with each of these master formulations in which the tackifier of Example IIA was added at the 2 pphR and 5pphR levels. Values of tensile strength, elongation, 100 percent MOD, 300 percent MOD and Shore A hardness were determined for currently produced samples and were likewise then determined on these samples after each had been heat-aged at 100° C. for 24 hours. Table IIB summarizes the data.

The tackifiers of the present invention as seen in Table IIB do not render other properties unsuitable after heat aging. In fact, as will be seen from the above table, in many instances, the tackifiers show no deterioration whatsoever in other properties. In Table IIB, tensile refers to tensile strength in psi. Elongation is a percentage, and 100 percent MOD and 300 percent MOD are in values in psi for the force needed to respectively obtain 100 percent elongation and 300 percent elongation. Shore A obviously refers to the hardness.

TABLE IIB

| | | ORIGINAL AND HEAT-AGED PROPERTIES | | | | | | | | | |
|---|---|---|---|---|---|---|---|---|---|---|---|
| | | TENSILE | | ELONGATION | | 100% MOD. | | 300% MOD. | | SHORE A | |
| COMPOUND | TACKIFIER | ORIG. | 100° C. 24 HR | ORIG. | 100° C. 24 HR | ORIG. | 100° C. 24 HR | ORIG. | 100° C. 24 HR | ORIG. | 100 24 |
| SBR | 0 | 1805 | 1682 | 413 | 600 | 238 | 390 | 1150 | 1255 | 58 | 59 |
| | 2 | 2257 | 2095 | 419 | 565 | 323 | 485 | 1558 | 1115 | 55 | 53 |
| | 5 | 2273 | 1495 | 454 | 360 | 327 | 280 | 1492 | 1210 | 54 | 50 |
| | 0 | 2342 | 2070 | 349 | 350 | 350 | 350 | 1870 | 1750 | 57 | 56 |
| | 2 | 2235 | 2990 | 398 | 500 | 258 | 355 | 1237 | 1510 | 51 | 61 |
| | 5 | 2288 | 2250 | 515 | 495 | 300 | 260 | 1275 | 1035 | 59 | 56 |
| | 0 | 1645 | 1260 | 563 | 265 | 120 | 270 | 425 | — | 36 | 57 |
| | 2 | 2058 | 2300 | 537 | 500 | 247 | 240 | 900 | 925 | 47 | 46 |
| | 5 | 2075 | 1935 | 552 | 430 | 233 | 250 | 767 | 1080 | 49 | 48 |

The samples, as produced in Example IIB above was also subjected to tack testing. These results are tabulated at Table IIC below. The data has been normalized for the value obtained when no tackifier was employed.

TABLE IIC

| | TACK RESULTS | | |
|---|---|---|---|
| RUBBER | TACKIFIER | 1 DAY | 7 DAY |
| SBR | 0 pphr | 1.0 | .95 |
| | 2 | 1.14 | 1.02 |
| | 5 | 1.37 | 1.12 |
| NBR | 0 | 1.0 | 1.25 |
| | 2 | 1.58 | 1.83 |
| | 5 | 1.27 | 1.93 |
| BUTYL | 0 | 1.0 | 1.0 |
| | 2 | 1.15 | 1.13 |
| | 5 | 1.28 | 1.02 |

EXAMPLE III

Using the samples as produced in Example IB along with the tackifiers produced in Example IA, samples were subjected to ozone treatments in order to determine the impact of ozone when employing tackifiers of the present invention. Table IIIA below sets forth the data for both NBR and SBR compounds with 2 and 5 pphR loading levels of the organic peroxide initiated reaction product tackifier formed in accordance with Example IA. Table IIIA below shows the data prior to ozone treatment and Table IIIB below shows the data on the samples subsequent to the ozone treatment. These samples were subjected to 50 pphM (parts per hundred million) ozone at 104° F. for 72 hours.

TABLE IIIA

| | (Before Aging) | | | |
|---|---|---|---|---|
| | NBR2 (phr) | NBR (5phr) | SBR(2phr) | SBR(5phr) |
| Tensile Strength, psi | 2680 | 3350 | 2630 | 2840 |
| 100% Modulus, psi | 330 | 310 | 285 | 330 |
| 300% Modulus, psi | 1520 | 1060 | 1110 | 1670 |
| Elongation, % | 420 | 610 | 570 | 510 |

TABLE IIIB

| | (After Aging) | | | |
|---|---|---|---|---|
| | NBR(2 phr) | NBR (5phr) | SBR(2phr) | SBR(5phr) |
| Tensile Strength, psi | 2610 | 2975 | 1840 | 2030 |
| 100% Modulus, psi | 650 | 520 | 575 | 840 |
| 300% Modulus, psi | — | 2575 | — | — |
| Elongation, % | 250 | 330 | 230 | 170 |

Those skilled in the art will readily appreciate that although the properties deteriorated the samples employing the tackifiers contemplated by the present invention are satisfactory.

U. S. Pat. No. 4,473,606 discloses the addition of about 5 to 25% by weight of a bitumen modified with polymers to another composition which includes a major proportion of bitumen and about 0.5 to about 7% by weight of a styrene-butadiene rubber along with other ingredients. It will be readily apparent that the present compositions and their properties are significantly different because the present vulcanizable compositions do not include any bitumen or asphalt except for that which has been employed in forming the reaction product. Of course, U.S. Pat. No. 4,473,606 in no way suggests that the bitumen modified polymers be formed as a reaction product which is initiated by an organic peroxide free radical material.

While the above describes the invention, it will of course be apparent that modifications are possible which pursuant to the patent status and laws do not depart from the spirit and scope thereof.

I claim:

1. In a vulcanizable composition comprising a vulcanizable rubber and at least one rubber additive which is a tackifier and optionally including fillers, the tackifier being present in a minor but effective tack enhancing amount, the improvement wherein said tackifier is a preformed reaction product of a mixture consisting essentially of asphalt and a vulcanizable rubber, wherein said vulcanizable composition except for said reaction product is substantially free of asphalt.

2. The vulcanizable composition of claim 1 wherein said reaction product is an organic peroxide initiated reaction product.

3. A vulcanized rubber composition produced by vulcanizing the composition of claim 1.

4. A vulcanized rubber composition produced by vulcanizing the composition of claim 2.

5. The vulcanizable composition of claim 2 wherein said vulcanizable rubber is a styrene-butadiene rubber.

6. The vulcanizable composition of claim 5 wherein said rubber used in forming said reaction product is a styrene-butadiene rubber.

7. The vulcanizable composition of claim 6 wherein said improved tackifier is employed in an amount in excess of about two parts per hundred parts of vulcanizable rubber.

8. The composition of claim 7 wherein the amount of said reaction product is about five parts per hundred parts by weight of rubber.

9. The vulcanizable composition of claim 1 wherein said reaction product is formed from the mixture consisting of said asphalt and rubber.

10. The vulcanizable composition of claim 1 wherein said vulcanizable rubber is styrene-butadiene rubber, nitrile-butadiene rubber, butyl rubber or mixtures thereof.

11. The composition of claim 1 wherein said vulcanizable rubber is a natural or synthetic rubber.

12. The composition of claim 11 wherein said vulcanizable rubber is a nitrile rubber, a butyl rubber or styrene-butadiene rubber.

13. The composition of claim 1 wherein the amount of rubber employed to form said reaction product is between about 1% to about 15% by weight based upon the combined amounts of asphalt and rubber.

14. The composition of claim 1 wherein the composition contains about 0.1 to about 5 parts by weight of said reaction product per hundred parts by weight of said vulcanizable rubber.

15. The composition of claim 1 wherein said vulcanizable rubber is a natural or synthetic rubber, wherein the amount of rubber which is employed to form the reaction product of asphalt and rubber is between about 1 to about 15% by weight based on the combined amounts of asphalt and rubber, and further wherein the amount of reaction product employed per hundred parts by weight of vulcanizable rubber is about 0.1 to about 5.0 parts by weight.

16. The composition of claim 15 wherein the vulcanizable rubber is a nitrile-butadiene rubber, a copolymer of isoprene and isobutylene, a styrene-butadiene rubber, polyisoprene, polychloroprene, polybutadiene, or ethylene-propylene-diene polymers.

* * * * *